(12) United States Patent  (10) Patent No.: US 7,364,308 B2
Murasugi  (45) Date of Patent: Apr. 29, 2008

(54) PROJECTOR APPARATUS

(75) Inventor: Hiroshi Murasugi, Kanagawa (JP)

(73) Assignee: Sony Corporation, Tokyo (JP)

( * ) Notice: Subject to any disclaimer, the term of this patent is extended or adjusted under 35 U.S.C. 154(b) by 175 days.

(21) Appl. No.: 11/224,074

(22) Filed: Sep. 13, 2005

(65) Prior Publication Data

US 2006/0056182 A1   Mar. 16, 2006

(30) Foreign Application Priority Data

Sep. 14, 2004   (JP) .......................... P2004-267400

(51) Int. Cl.
*G03B 21/16*   (2006.01)
*G03B 21/18*   (2006.01)
*H04N 5/74*   (2006.01)
*F21V 29/00*   (2006.01)
*F21V 7/20*   (2006.01)

(52) U.S. Cl. .......................... 353/61; 353/60; 348/748; 362/264; 362/294; 362/345; 362/373

(58) Field of Classification Search ................ 353/61, 353/52, 57, 58, 60, 47, 74, 79; 349/161; 348/748, 87, 789, 794, 836; 362/264, 294, 362/345, 373
See application file for complete search history.

(56) References Cited

U.S. PATENT DOCUMENTS 5,722,753 A * 3/1998 Okada et al. ............... 353/119

6,481,854 B1 * 11/2002 Sugawara et al. ............ 353/52

FOREIGN PATENT DOCUMENTS

JP   2001-183746   7/2001

* cited by examiner

*Primary Examiner*—Rochelle Blackman
(74) *Attorney, Agent, or Firm*—Finnegan, Henderson, Farabow, Garrett & Dunner, L.L.P.

(57) ABSTRACT

A projector apparatus, including: a light source including a high-pressure discharge lamp having a plurality of ventilation holes; an optical unit having a liquid crystal panel for optically modulating to light emitted from the light source in response to an input video signal; a ventilation fan; and cooling means for cooling the light source by blowing cooling-air blown from the ventilation fan to at least the light source, wherein a cooling-air ventilation inlet facing one ventilation hole of the high-pressure discharge lamp is formed at an upper position of a lamp case, which holds and fixes the high-pressure discharge lamp having the plurality of ventilation holes and positions and fixes the optical unit, a cooling-air ventilation outlet facing another ventilation hole of the high-pressure discharge lamp is formed at a lower position of the lamp case, and a tray is provided under the cooling-air ventilation outlet.

14 Claims, 8 Drawing Sheets

PROJECTOR APPARATUS

BACKGROUND OF THE INVENTION

1. Field of the Invention

The present invention relates to a projector apparatus for projecting and displaying an image on a screen or the like by irradiating light from a light source accommodated in a housing to a transmission type liquid crystal panel.

2. Description of Related Art

A projector apparatus uses three transmission type liquid crystal panels for controlling colors, e.g., red, green and blue, synthesizes these three color components, and magnifies and projects the synthesized light through a lens. FIG. 2 is a schematic diagram showing an optical system of a general projector apparatus. From illumination light L emitted from a light source 1, red light R is separated and reflected by a dichroic mirror 2a. The separated and reflected red light R is reflected by a reflecting mirror 3a and reaches a transmission type liquid crystal panel 4a for red color.

As for green light G and blue light B transmitted through the dichroic mirror 2a, green light G is separated and reflected by a dichroic mirror 2b. The separated and reflected green light G reaches a transmission type liquid crystal panel 4b for green color. On the other hand, the blue light B transmitted through the dichroic mirror 2b is reflected by a reflecting mirror 3b, passed through a lens 5, is reflected by a reflecting mirror 3c, and reaches a transmission type liquid crystal panel 4c for blue color.

The red light R, green light G and blue light B are optically modulated when they transmit through the transmission type liquid crystal panels 4a, 4b and 4c, respectively, which panels are driven by a drive circuit in response to red, green and blue video signals, respectively. Thereafter, colors of respective optically modulated light are color-synthesized by a complex prism 6, and color-synthesized light is magnified and projected on a screen 17 by a magnifying/projecting lens (not shown). In this manner, an image can be displayed on the screen 17. In the projector apparatus, an optical axis of the light source 1 and an optical axis of an optical system are made coincident, by forming a positioning hole in one of a case accommodating the light source and a case accommodating the optical system, such as the dichroic mirror 2a, placed behind the former case, and forming a positioning pin on the other.

The light source used here is a high-pressure discharge lamp, such as a metal halide lamp and a super high-pressure mercury lamp, to which a relatively high-pressure discharge gas is sealed. This high-pressure discharge lamp (hereinafter simply called a "lamp") is, for example, a lamp 100 having an appearance such as shown in FIG. 8, and a glass bulb 101 with a swelled portion 101a is mounted upright at the center of a concave mirror 105. The swelled portion 101a of the glass bulb 101 in which gas is sealed becomes a light emission region. One end of the glass bulb 101 is electrically connected to a male screw 104 via a metal member 103, and the other end at the top of the glass bulb 101 is connected to an electrode terminal 102 on a mirror outer surface 106 of the lamp 100 via a hole formed through the concave mirror 105, to thereby supply a discharge voltage. A flat glass 107 is mounted in front of the lamp 100.

The glass 107 has ventilation holes 100a and 100b of semicircular openings formed inside the glass 107 and at upper and lower positions of the concave mirror 105. The ventilation holes 100a and 100b form a ventilating duct for air-cooling the light emission region, the ventilating duct extending vertically in the lamp 100. The ventilation holes 100a and 100b forcibly air-cool the glass bulb 101 and its nearby area, the glass bulb 101 is driven at a startup discharge voltage of 250 kV and at a high voltage of several kV even at a discharge voltage during a stable operation, and has a high temperature. Glass of the glass bulb 101 containing sealed discharge gas is deteriorated with a long term usage, and the glass bulb 101 itself may be broken due to its lifetime or the like. The glass 107 on the lamp front side is provided also for protection from scattered matters when the glass bulb 101 happens to be broken.

However, when the glass bulb is broken, pieces of broken glass or the like stray and spread widely into the optical unit via the ventilation holes of the lamp in some cases to deteriorate the optical performance. To address this drawback, various studies have been made. For example, Japanese Patent Application Publication No. 2001-183746 (page 2, FIGS. 6 and 7) discloses a technique by which the optical performance is prevented from being deteriorated by pieces of broken glass and the like scattered from a cooling-air inlet port to the inside of an outer housing of a projector apparatus. Japanese Patent Application Publication No. 2001-183746 discloses a lamp box accommodating a light source and removably mounted in the outer housing, which lamp box is provided with: a transparent protective member disposed at a light output port of a light source; a cooling-air inlet port for guiding cooling-air from cooling means to the light source; and automatic shutter means mounted at the cooling-air inlet port for automatically opening the cooling-air inlet port by mounting the lamp box in the outer housing and automatically closing the-cooling-air inlet port by dismounting the lamp box from the outer housing.

SUMMARY OF THE INVENTION

In the lamp box of the projector apparatus disclosed in Japanese Patent Application Publication No. 2001-183746, the shutter is closed when a ventilation duct extending from a ventilation fan for air-cooling a lamp is not coupled to the cooling-air inlet port of the lamp box, and the shutter is opened during a normal use while the lamp box is mounted and its cooling-air outlet port is connected. In other words, glass bulb breakage is very unlikely but usually happens during the normal use. During the normal use, the connected shutter remains open so that pieces of broken glass may enter into the ventilation duct and an optical unit case integrally formed with the upper part of the ventilation duct from the cooling-air inlet port of the lamp box. Therefore, there is difficulty in avoiding the deterioration of the optical system performance perfectly.

Under these circumstances, the present invention proposes a projector apparatus capable of forcibly and efficiently cooling a light emission region and mitigates the influence of pieces of broken glass of a lamp without sacrificing a cooling efficiency.

In order to solve these issues, a projector apparatus according to an embodiment of the present invention includes: a light source including a high-pressure discharge lamp having a plurality of ventilation holes; an optical unit having a liquid crystal panel for optically modulating to light emitted from the light source in response to an input video signal; a ventilation fan; and cooling means for cooling the light source by blowing cooling-air blown from the ventilation fan to at least the light source, wherein a cooling-air ventilation inlet facing one ventilation hole of the high-pressure discharge lamp is formed at an upper position of the lamp case, which holds and fixes the high-pressure discharge lamp having the plurality of ventilation holes and positions and fixes the optical unit, a cooling-air ventilation outlet facing another ventilation hole of the high-pressure discharge lamp is formed at a lower position of the lamp case, and a tray is provided under the cooling-air ventilation outlet.

The projector apparatus according the embodiment, wherein the cooling means has a ventilation duct for blowing cooling-air blown from the ventilation fan to at least the light source.

The projector apparatus according to the embodiment, wherein the ventilation fan is a sirocco fan.

According to another embodiment of the present invention, a projector apparatus for displaying an image on a screen disposed on an outer surface of a housing by using a liquid crystal panel, includes: a light source including a high-pressure discharge lamp having a plurality of ventilation holes; an optical unit having the liquid crystal panel for optically modulating to light emitted from the light source in response to an input video signal; a ventilation fan; and cooling means for cooling the light source by blowing cooling-air blown from the ventilation fan to at least the light source, wherein a cooling-air ventilation inlet facing one ventilation hole of the high-pressure discharge lamp is formed at an upper position of the lamp case, which holds and fixes the high-pressure discharge lamp having the plurality of ventilation holes and positions and fixes the optical unit, a cooling-air ventilation outlet facing another ventilation hole of the high-pressure discharge lamp is formed at a lower position of the lamp case, and a tray is provided under the cooling-air ventilation outlet.

The projector apparatus according to another embodiment, wherein the cooling means has a ventilation duct for blowing cooling-air blown from the ventilation-fan to at least the light source.

The projector apparatus according to another embodiment, wherein the ventilation fan is a sirocco fan.

According to the projector apparatus constructed as above, a glass bulb can be cooled by introducing cooling-air from the ventilation fan into the ventilation hole disposed at an upper position of the lamp via a duct disposed above the cooling-air ventilation inlet of a light source unit and exhausting the cooling-air via the cooling-air ventilation outlet under the other ventilation hole, and the tray disposed under the cooling-air ventilation outlet can accumulate pieces of broken glass if the glass bulb is broken.

According to the projector apparatus of the present invention, the glass bulb of the high-pressure discharge lamp can be cooled efficiently, and even if the glass bulb is broken, pieces of broken glass and the like can be accumulated in the tray so that it is possible to avoid damages to an optical system and damages to an external to be caused by pieces of broken glass and the like exhausted to an outside of the projector apparatus.

BRIEF-DESCRIPTION OF THE DRAWINGS

DESCRIPTION OF THE PREFERRED EMBODIMENT

With reference to FIGS. 1 to 8, description will be made on an embodiment to implement a projector apparatus according to the present invention.

Figure 1:
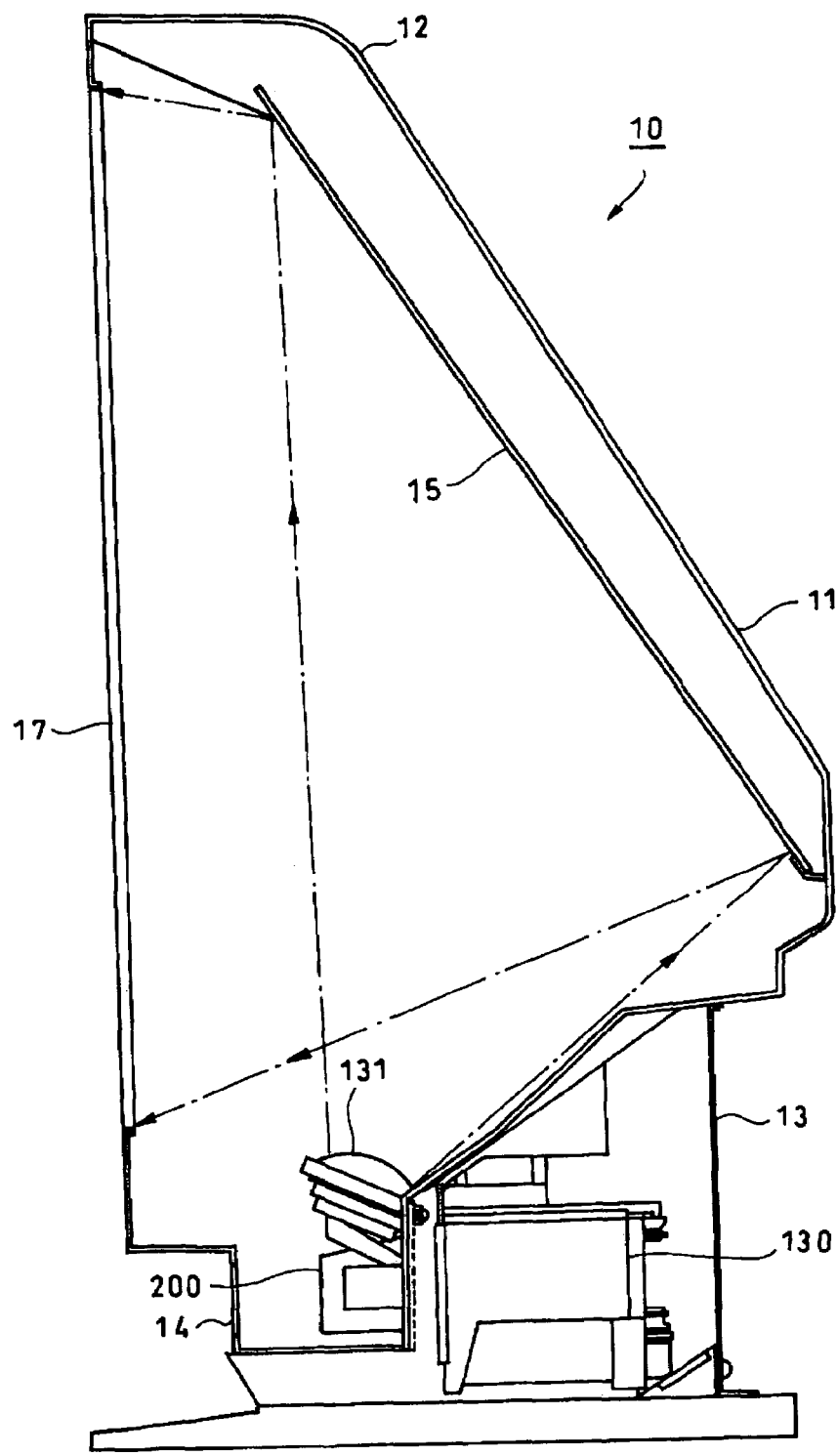
FIG. 1 is a schematic side view showing an internal structure of a projector apparatus according to an embodiment of the present invention.

First, with reference to FIGS. 1 and 2, the outline of the projector apparatus of the embodiment will be described. FIG. 1 is a schematic side view showing an internal structure of the projector apparatus of the embodiment, and FIG. 2 is an illustrative diagram showing an optical system of the projector apparatus.

Referring to FIG. 1, a projector apparatus 10 is a so-called three-panel liquid crystal projector apparatus using three transmission type liquid crystal panels. The projector apparatus 10 has a housing 11. A screen 17 is disposed on the front side of an upper portion 12 of the housing 11, and a mirror 15 is disposed on the inner back side of the upper portion 12 of the housing 11. An optical unit 130 and a lamp case 200 coupled to the optical unit are disposed in an inner central area of a lower portion 13 of the housing 11, and electronic circuits, a cooling fan and the like (not shown) are disposed near the optical unit and lamp case. A lamp case inlet/outlet port 14 is provided on the front side of the lower portion 13 of the housing 11 to replace the lamp case 200 or the like.

Figure 2:
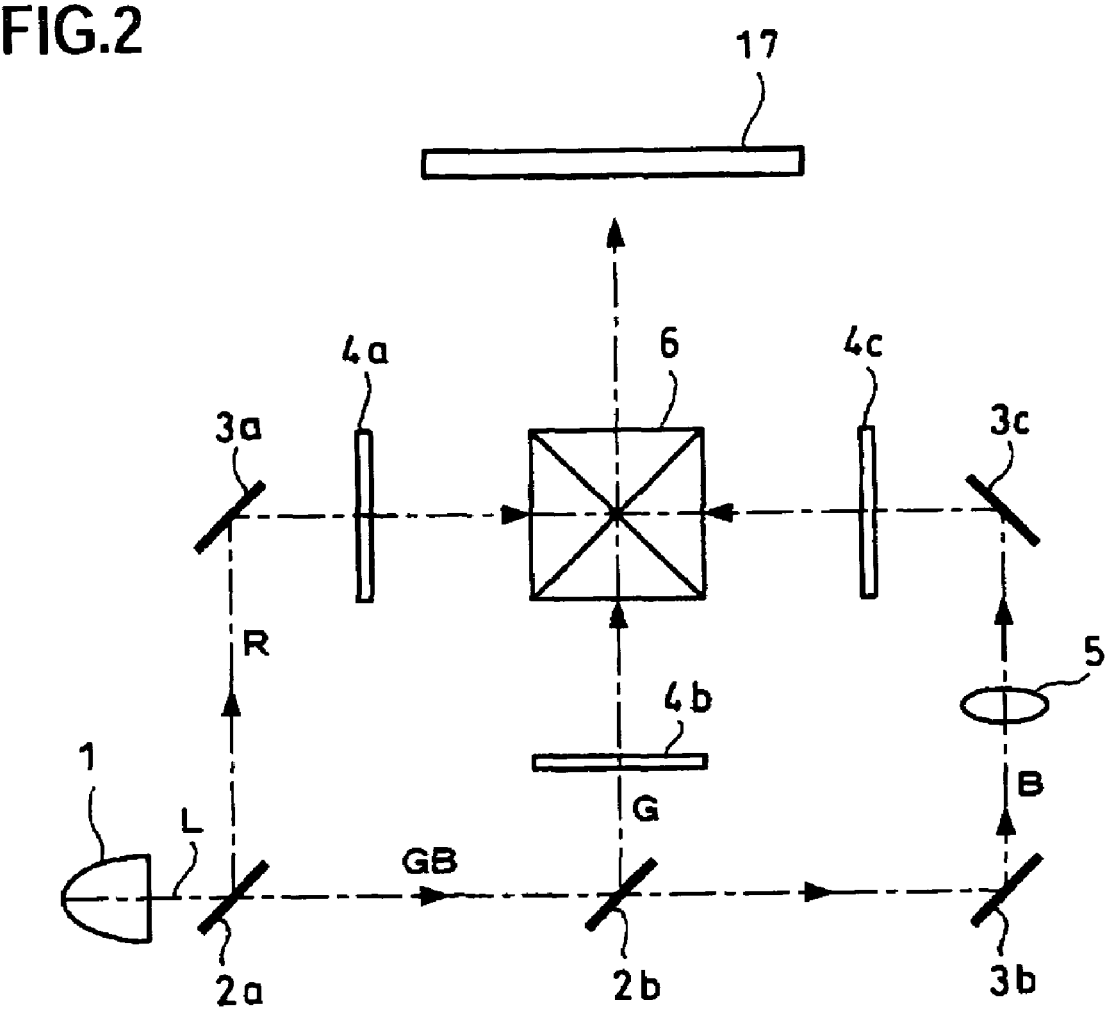
FIG. 2 is an illustrative diagram showing an optical system of a general projector apparatus.

FIG. 2 is an illustrative diagram showing an optical system of the projector apparatus. Referring to FIG. 2, from illumination light L emitted from a light source 1, red light R is separated and reflected by a dichroic mirror 2a. The separated and reflected red light R is reflected by a reflecting mirror 3a and reaches a transmission type liquid crystal panel 4a for red color. From green light G and blue light B transmitted through the dichroic mirror 2a, green light G is separated and reflected by a dichroic mirror 2b. The separated and reflected green light G reaches a transmission type liquid crystal panel 4b for green color. On the other hand, the blue light B transmitted through the dichroic mirror 2b is reflected by a reflecting mirror 3b, passed through a lens 5, is reflected by a reflecting mirror 3c, and reaches a transmission type liquid crystal panel 4c for blue color.

The red light R, green light G and blue light B are optically modulated when they transmit through the transmission type liquid crystal panels 4a, 4b and 4c, respectively, which panels are driven by a drive circuit in response to red, green and blue video signals, respectively. Thereafter, colors of respective optically modulated light are color-synthesized by a complex prism 6, and color-synthesized light is magnified and projected by a projecting lens 131 (refer to FIG. 1) disposed at the subsequent stage of the complex prism 6. Light transmitted through the projecting lens 131 is reflected by the mirror 15 and magnified and projected on a back side (inner side) of a screen 17. In this manner an image can be displayed on the screen 17 (refer to FIG. 1).

Figure 3:
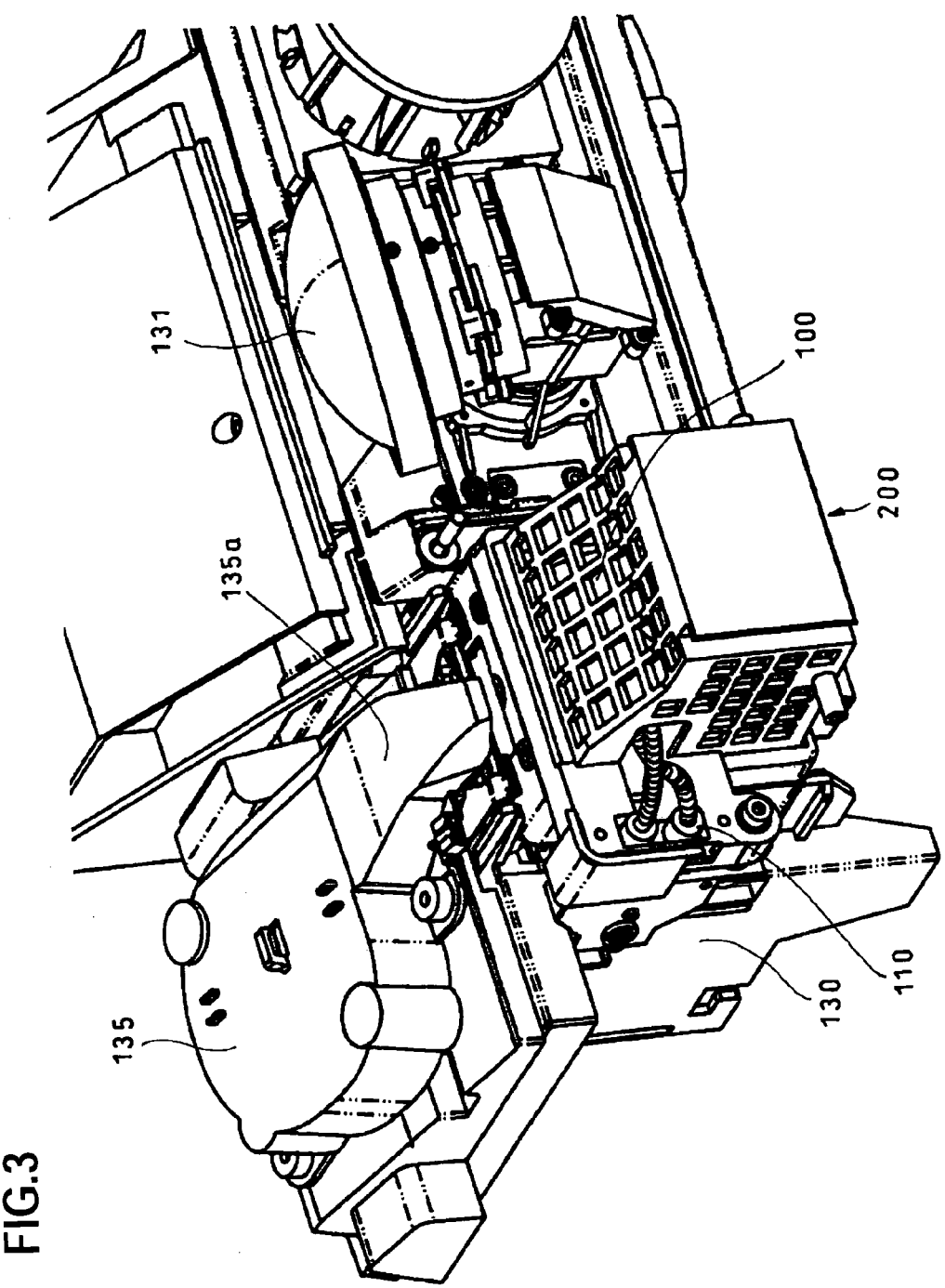
FIG. 3 is an external perspective view illustrating amount state of a lamp case on an optical unit of the projector apparatus shown in FIG. 1.
Figure 4:
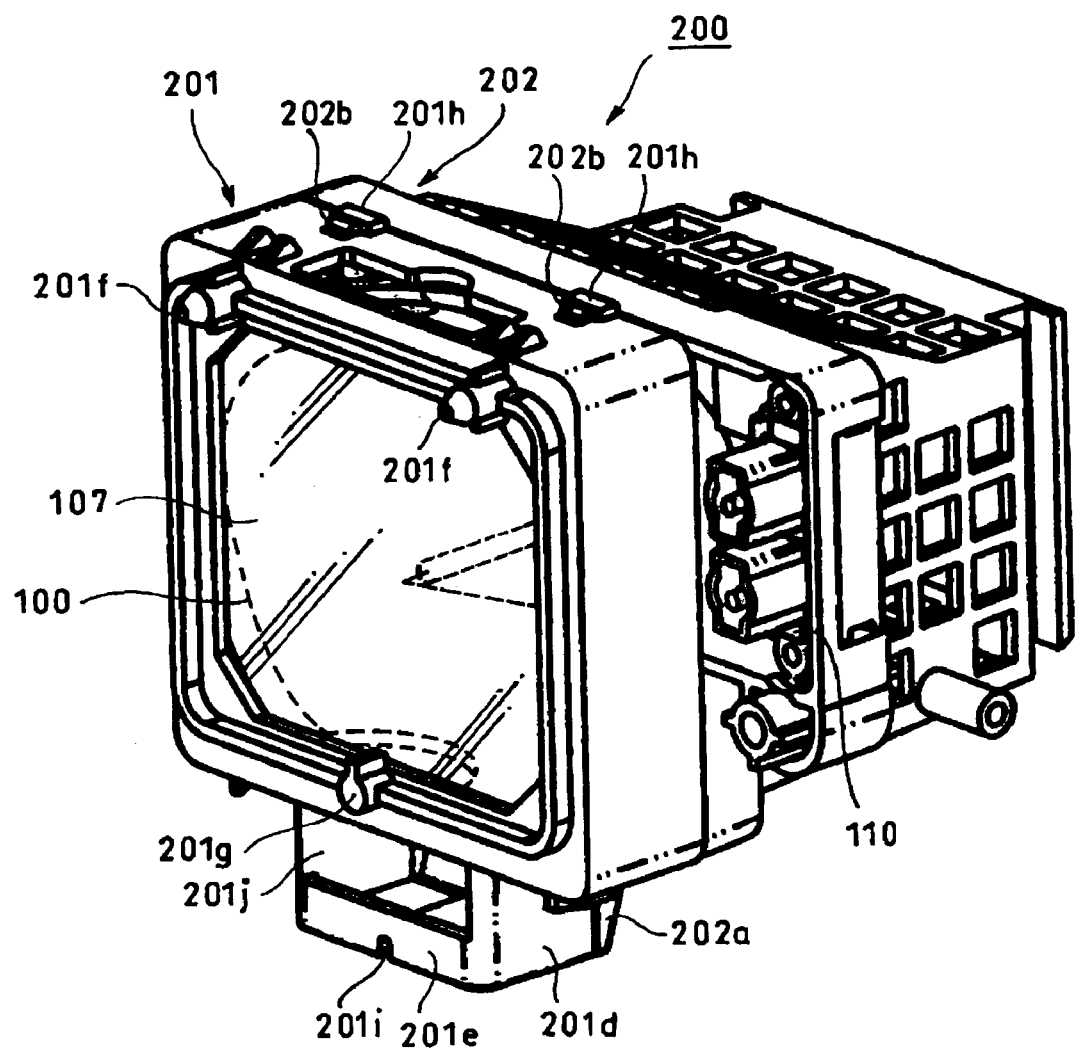
FIG. 4 is an external perspective view of the lamp case accommodating a lamp of the projector apparatus shown in FIG. 1.
Figure 5:
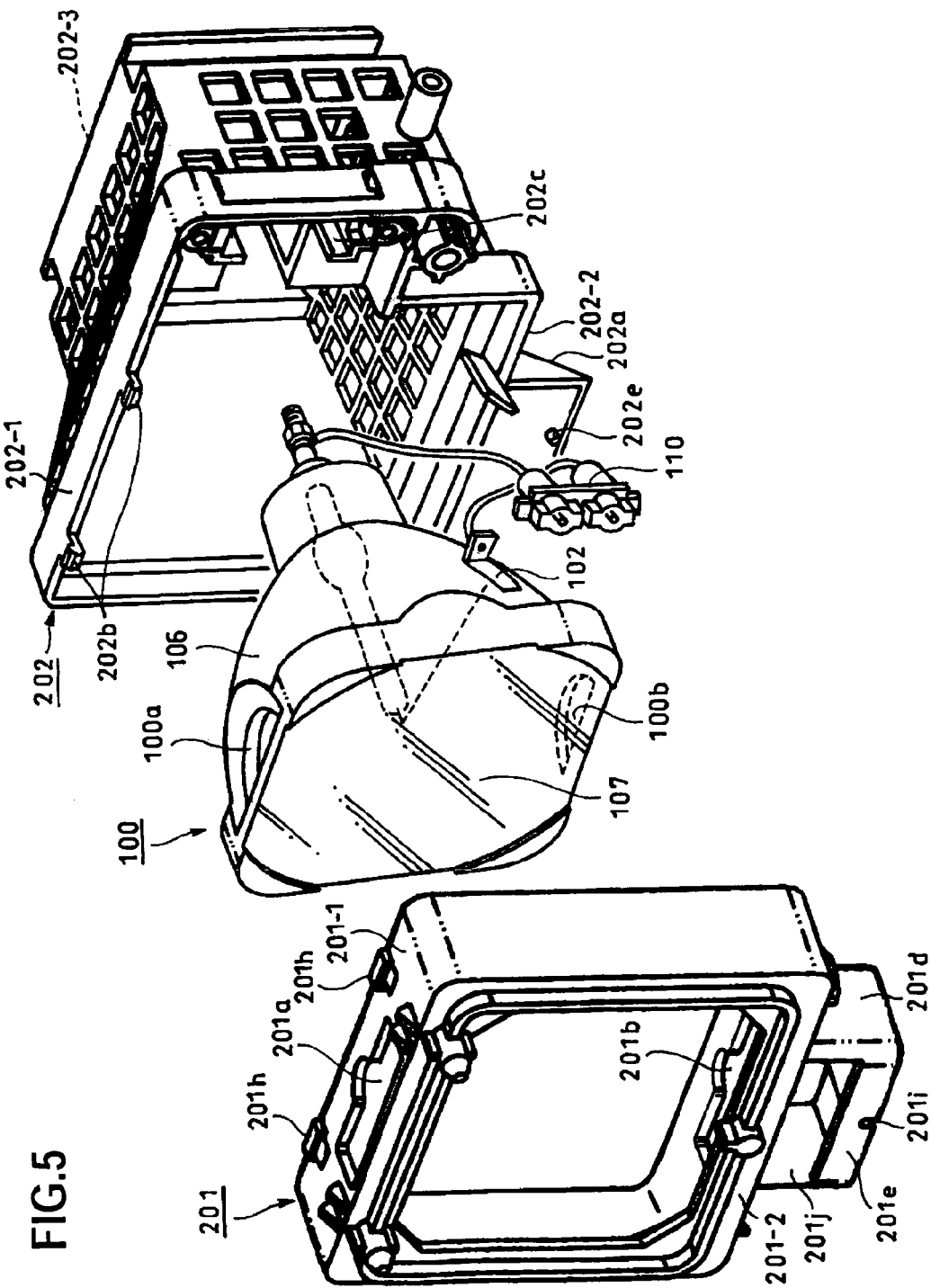
FIG. 5 is an exploded perspective view of the lamp case accommodating the lamp shown in FIG. 4.
Figure 6:
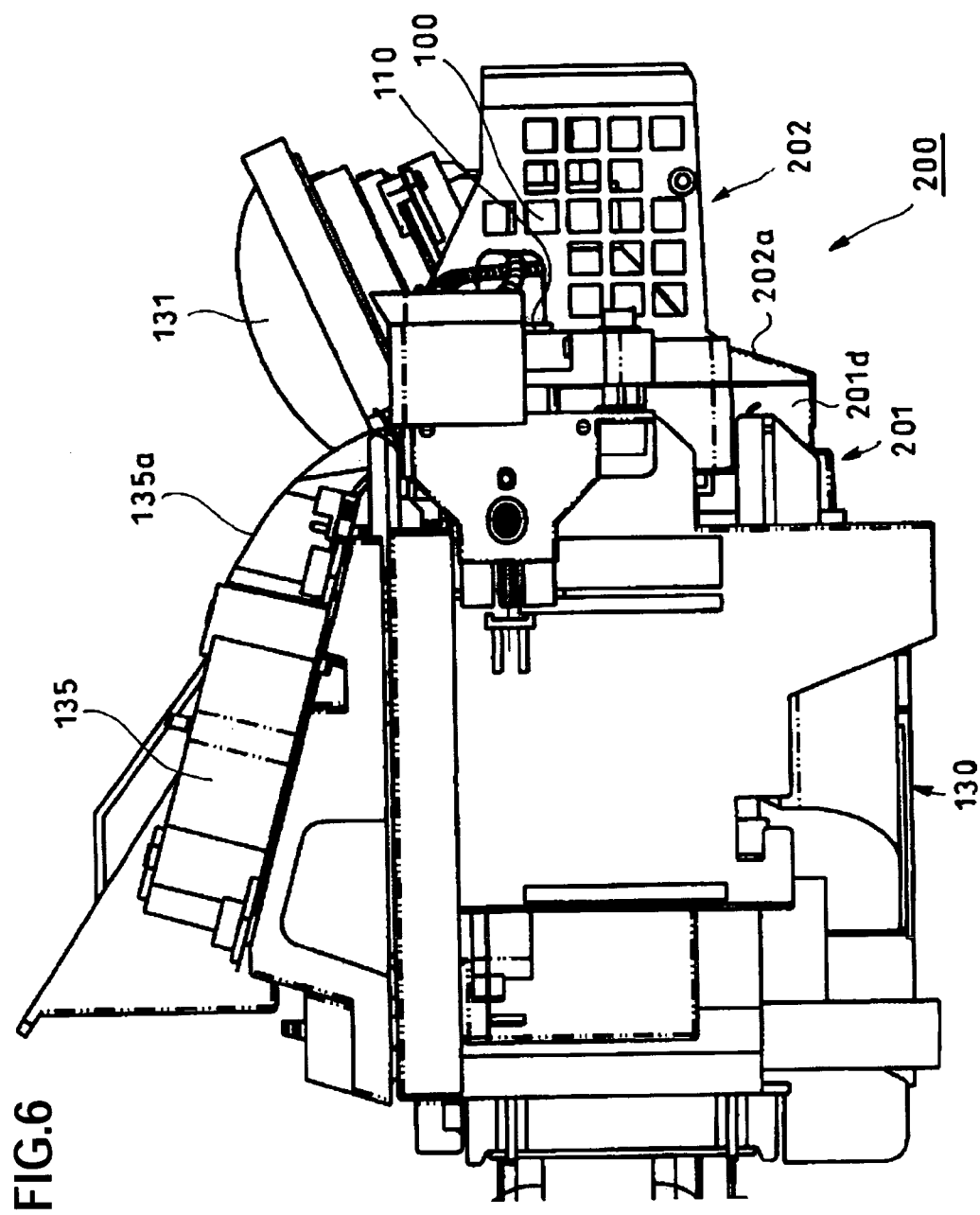
FIG. 6 is a side view showing a mount state of the lamp case of the projector apparatus shown in FIG. 3.
Figure 7:
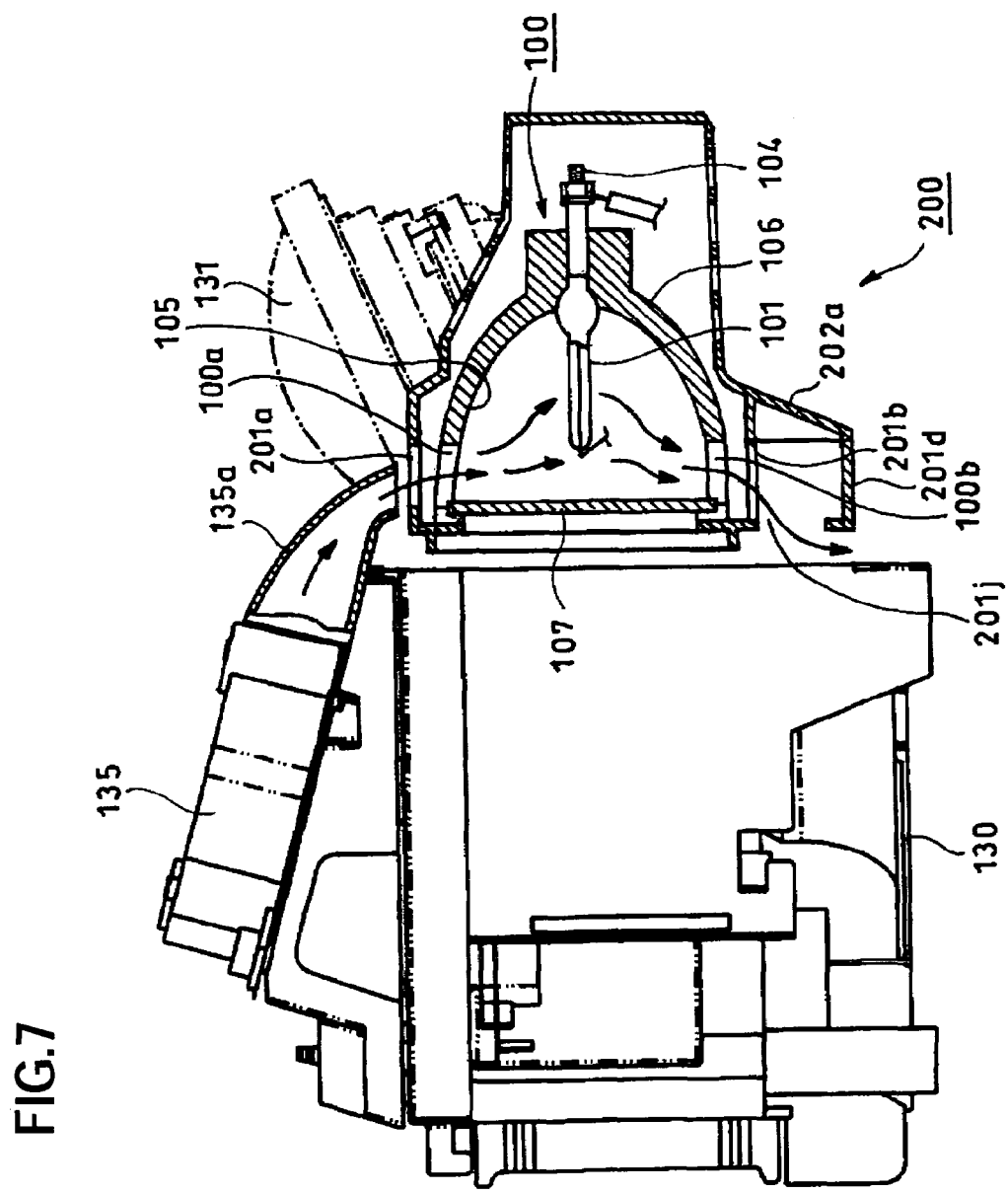
FIG. 7 is a side cross sectional view showing the lamp case and a partial ventilation duct shown in FIG. 6.

Next, the lamp case 200 of the embodiment will be described with reference to FIGS. 3 to 8. FIG. 3 is an external perspective view illustrating a mount state of lamp case 200 on the optical unit 130, FIG. 4 is an external perspective view of the lamp case 200, FIG. 5 is an exploded perspective view of the lamp case 200, FIG. 6 is a side view showing the mount state of the lamp case 200 shown in FIG. 3, and FIG. 7 is a partial side cross sectional view of the lamp case 200 shown in FIG. 6.

As shown in FIG. 3, the lamp case 200 is coupled to the optical unit 130 as a different unit and mounted on the same side as that of the projecting lens 131 optically integral with the optical unit 130. An opening of a ventilation duct 135a of a ventilation fan unit 135 mounted above the optical unit 130 faces a cooling-air ventilation inlet 201a (refer to FIG. 4) formed in an upper portion of the lamp case 200 so that cooling-air can be supplied to the inside of the lamp case 200. As shown in FIGS. 4 and 5, the lamp case 200 is constituted of a front case 201 and a rear case 202. A high-pressure discharge lamp 100 is accommodated and fixed in the lamp case.

Figure 8:
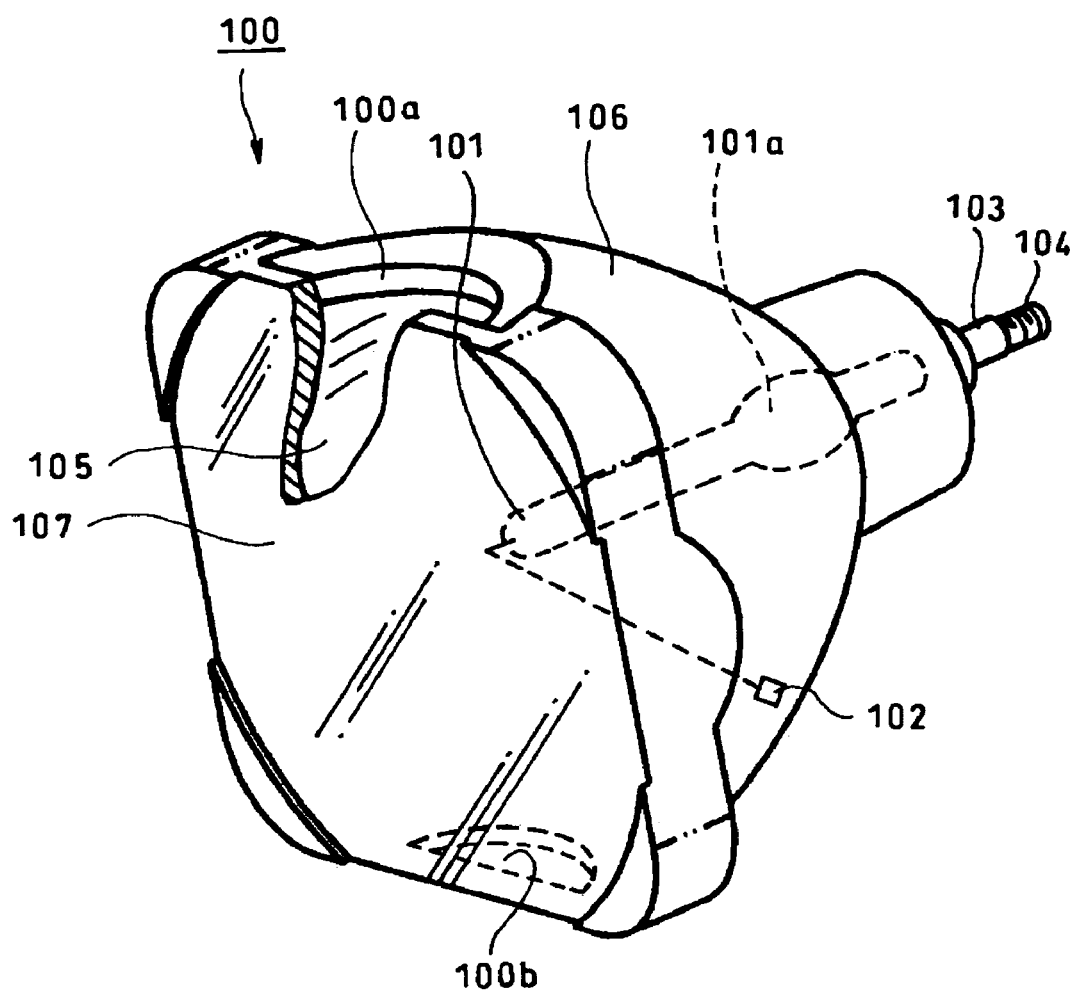
FIG. 8 is a perspective view of a high-pressure discharge lamp used in the projector apparatus shown in FIG. 1.

The high-pressure discharge lamp (hereinafter simply called a lamp) 100 may be a metal halide lamp or a super high-pressure mercury lamp having a relatively high-pressure of discharge gas sealed in the lamp, and has, for example, an appearance such as shown in FIG. 8. A glass bulb 101 with a swelled portion 101a is mounted upright at the center of a concave mirror 105. The swelled portion 101a of the glass bulb 101 in which discharge gas is sealed becomes a light emission region. One end of the glass bulb is electrically connected to a male screw 104 protruding from a metal member 103, and the other end at the top of the glass bulb 101 is connected to an electrode terminal 102 on a mirror outer surface 106 of the lamp via a hole formed through the concave mirror 105, to thereby supply a discharge voltage. A flat glass 107 is mounted in front of the lamp.

The glass 107 disposed on the lamp front side has ventilation holes 100a and 100b of semicircular openings (shown in FIG. 8) formed at upper and lower positions of the concave mirror 105. The ventilation holes form a ventilating duct for air-cooling the light emission region, the ventilating duct extending vertically in the lamp 100. The ventilation holes forcibly air-cool the glass bulb 101 driven at a startup discharge voltage of 250 kV and at a high voltage of several kV even at a discharge voltage during a stable operation and has a high temperature. Glass of the glass bulb 101 containing sealed discharge gas is deteriorated with a long term usage, and the glass bulb 101 itself may be broken before it is replaced with a new lamp 100. The glass 107 on the lamp front side is provided also to prevent pieces of broken glass from scattering toward the optical unit 130 when the glass bulb 101 happens to be broken.

As shown in FIG. 5, ends of wiring are fixed to the male screw 104 and electrode terminal 102 of the lamp 100, respectively, with screws, and the other ends are connected to a connector 110 having two terminals. Since the wiring have also a high temperature during lamp turn-on, heat resistance coating material is selected for the wiring.

As shown in FIG. 5, the front case 201 is a short tube having an approximately rectangular cross section and a frame formed on one open end thereof. A cooling-air ventilation inlet 201a of approximately a rectangular shape is formed in an upper wall 201-1 of the tube placed laterally, and a cooling-air ventilation outlet 201b of approximately a rectangular shape is formed in a lower wall 201-2. On the lower wall 201-2, the cooling-air ventilation outlet 201b and a tray 201d are mounted. The tray 201d is made of a tube whose opening is disposed laterally, and is formed integrally with the lower wall 201-2 of the front case 201. A wall 201e is formed extending upward from the lower side and covering a lower portion of the opening on the frame side, and an opening 201j is formed through this wall (refer to FIG. 7).

As shown in FIG. 4, on the side where the frame of the tube is formed, two positioning projections 201f and 201f are formed and one gap setting projection 201g is formed. In the inner side of the frame, screw holes (not shown) are formed to fix the lamp 100. Two engaging members 201h and 201h for fixing and positioning the rear case 201-2 are formed on the upper wall 201-1 of the front case 201 placed laterally as shown in FIG. 4. A screw hole 201i for fixing the rear case 202 is formed in the tray 201d mounted on the lower wall 201-2.

As shown in FIG. 5, the rear case 202 is made of a basket of an approximately rectangular solid placed laterally. A bottom wall 202-3 is made of a single plate (refer to FIG. 3). Meshes of the basket are approximately rectangular. A height of a rectangular opening of the basket shown in FIG. 5 is approximately the same as that of the front case 201, and a width thereof is set so as to be able to arrange a connector fixing unit 202c for the connector 110 to be connected to the lamp 100 next to the front case 201.

A slanted flange 202a is mounted on a lower wall 202-2 of the rectangular opening of the rear case 202. This flange 202a has a size capable of hermetically sealing the whole opening at the end of the tray 201d of the front case 201. Two engaging craws 202b and 202b for positioning and fixing the front case 201 are formed on an upper wall 202-1 of the rectangular opening, and a screw hole 202e is formed in the flange 202a to fix the tray 201d of the front case 201.

As shown in FIG. 5, the lamp 100 is first fixed to the front case 201 of the lamp case 200 constructed as above with screws, exposing the front glass 107 (refer to FIG. 4). The engaging craws 202b and 202b of the rear case 202 are engaged with the engaging members 201h and 201h of the front case 201 to cover the metal member 103 and male screw 104 projecting on the rear side of the lamp 100, the electrode terminal 102 mounted on the mirror outer surface 106, and the wiring fixing screws fixed to the male screw 104 and electrode terminal 102. In this engaging state, screws are threaded into the tray 201d of the front case 201 to fix the rear case 202 (refer to FIG. 4).

In this case, as shown in FIG. 3, the connector 110 of the lamp 100 is pulled out of the rear case 202, and as shown in FIG. 4, fixed to the connector fixing unit 202c of the rear case 202. As shown in FIG. 4, the upper and lower ventilation holes 100a and 100b face the cooling-air ventilation inlet 201a and cooling-air ventilation outlet 201b of the front case 201, and the opening 201j of the tray 201d is directed toward a light illumination direction. Replacement of the lamp 100 is usually performed in the unit of the lamp case 200.

As shown in the side view of FIG. 6, the lamp case 200 is positioned and fixed relative to the optical unit 130 as the two positioning projections 201f and 201f on the front glass 107 side of the lamp 100 are engaged with engaging members (not shown) of the optical unit 130. In this case, an optical axis of the lamp case 200 is made coincident with an optical axis of the subsequent optical system of the optical unit 130 such as the dichroic mirror 2a. The optical unit 130 is connected to the lamp case 200 only optically, and no opening is formed on the mount side of the lamp case 200. As shown in FIGS. 3 and 6, the ventilation fan unit 135 assembling a sirocco fan or the like is mounted above the optical unit 130. The ventilation duct 135a extends from the ventilation fan unit to the position above the cooling-air ventilation inlet 201a of the lamp case 200.

FIG. 7 is a cross sectional view of the lamp case 200 shown in FIG. 6 taken along approximately the center of the lamp 100 and a partial ventilation duct 135a. In a state that the lamp 100 is fixed in the lamp case 200 shown in FIG. 7, the ventilation hole 100a of the lamp 100 faces the cooling-air ventilation inlet 201a of the front case 201, whereas the ventilation hole 100b faces the cooling-air ventilation outlet 201b. A ventilation opening of the ventilation duct 135a is disposed approximately just above the cooling-air ventilation inlet 201a of the front case 201, and the tray 201d is disposed under the cooling-air ventilation outlet 201b.

Cooling-air blown from the ventilation fan unit 135 is guided from the opening of the ventilation duct 135a to the inside of the lamp 100 via the cooling-air ventilation inlet 201a of the front case 201 and the ventilation hole 100a of the lamp 100 to thereby cool the glass bulb 101, the swelled portion 101a as the light emission region and the concave mirror 105, as indicated by arrows in FIG. 7. Heated air is exhausted from the opening 201j of the tray 201d via the lower ventilation hole 100b of the lamp 100 and the cooling-air ventilation outlet 201b of the front case 201 (refer to FIG. 4).

Heat radiated from the mirror outer surface 106 of the lamp 100 is dissipated to the inside of the housing 11 of the projector apparatus 10 shown in FIG. 1 via a number of rectangular meshes of the basket of the rear case 202. Heat is further expelled to outside by a cooling fan (not shown) mounted in the lower portion 13 of the housing 11. In this embodiment, cooling-air is blown from the ventilation fan unit 135 assembling a sirocco fan or the like, and forcibly blown downward into the inside of the lamp 100. Therefore, as compared to that cooling-air is introduced upward into the lamp 100, a chimney effect, i.e., a temperature difference between upper and lower positions due to a rise of heated air, can be suppressed. Since the upper position of the lamp 100 and lamp case 200 is not heated to an extremely high temperature, the adverse effect of the temperature to the optical unit 130 coupled to the lamp case 130 can be mitigated.

Even if pieces of broken glass are scattered when the glass bulb 101 is broken, the glass pieces are accumulated on the bottom of the tray 201d via the lower ventilation hole 100b of the lamp 100 and the cooling-air ventilation outlet 201b of the front case 201. Since the lamp case 200 and the optical unit 130 are spaced apart, the optical unit 130 will not be damaged with scattered glass pieces. Therefore, even if the lamp case 200 is replaced with a new one, the optical performance before replacement can be maintained.

The lamp case 200 constructed as above can be used in the projector apparatus 10 which uses the lamp 100 mounted in the lamp case 200 as the light source 1 shown in FIG. 1, synthesizes light components of, e.g., red (R), green (G) and blue (B) by using three transmission type liquid crystal panels 4a, 4b and 4c, and magnifies and projects the synthesized light on the screen 17 via the lens.

According to the projector apparatus 10 and its lamp case 200 of the embodiment, the assembled lamp 100 can be forcibly and efficiently air-cooled, and it is possible to avoid an adverse effect of glass pieces to the optical system even if the lamp is broken.

In this embodiment, the projector apparatus of the type of a so-called three-panel liquid crystal projection television has been described in which the optical unit having three transmission type liquid crystal panels 4a, 4b and 4c and the light source are accommodated in the housing. The invention is not limited thereto, but it may be applied to a projector apparatus of a so-called video projector type in which an image is displayed on a screen disposed on a wall or the like. Further, the invention is not limited to the three-panel type, but obviously the invention is applicable to a single-panel projector apparatus using one transmission type liquid crystal panel.

The projector apparatus and its light source of the invention are not limited to the above-described embodiment, but it is obvious that various other structures may be adopted without departing from the gist of the present invention.

The present invention contains subject matter related to Japanese Patent Application JP2004-267400, filed in the Japanese Patent Office on Sep. 14, 2004, the entire contents of which being incorporated herein by reference.

What is claimed is:

1. A projection apparatus, comprising:
   a light source including a lamp and a glass bulb, the light source further including a first hole in an upper portion of the glass bulb and a second hole in a lower portion of the glass bulb;
   a lamp case including a front case and a rear case, the front case engaging the rear case to securely enclose the light source in the lamp case;
   a cooling unit including a ventilation fan, the fan blowing cooling air into the light source through the first hole; and
   an optical unit for modulating light emitted from the light source in response to an input video signal;
   the front case further comprising:
   an air inlet in an upper wall of the front case and aligned with the first hole of the light source;
   an air outlet in a lower wall of the front case and aligned with the second hole of the light source; and
   a tray integrally formed on and extended from the lower wall of the front case, the tray facing the air outlet.

2. The projector apparatus of claim 1, wherein the cooling unit further comprises a ventilation duct for guiding the cooling air into the light source.

3. The projector apparatus of claim 1, wherein the ventilation fan comprises a sirocco fan.

4. The projection apparatus of claim 1, wherein the rear case comprises a basket having a plurality of openings therein.

5. The projection apparatus of claim 1, wherein, if the glass bulb of the light source breaks into glass pieces, the tray accumulates the glass pieces evacuated from the light source by the cooling air through the second hole and the air outlet.

6. The projection apparatus of claim 5, wherein the rear case further comprises a slanted flange on a lower wall of the rear case, the slanted flange sealing an opening of the tray that faces the rear case.

7. The projection apparatus of claim 1, wherein the lamp comprises a high pressure discharge lamp.

8. A light source assembly, comprising:
   a light source including a lamp and a glass bulb, the light source further including a first hole in an upper portion of the glass bulb and a second hole in a lower portion of the glass bulb;
   a lamp case including a front case and a rear case, the front case engaging the rear case to securely enclose the light source in the lamp case, the front case comprising:
   an air inlet formed in an upper wall of the front case and aligned with the first hole of the light source;
   an air outlet formed in a lower wall of the front case and aligned with the second hole of the light source; and
   a tray formed on the lower wall of the front case, the tray facing the air outlet of the front case.

9. The light source assembly of claim 8, wherein, if the glass bulb of the light source breaks into glass pieces, the tray accumulates the glass pieces evacuated from the lamp case through the air outlet.

10. The light source assembly of claim 8, wherein the rear case comprises a basket having a plurality of openings therein.

11. The light source assembly of claim 8, wherein the lamp comprises a high pressure discharge lamp.

12. The light source assembly of claim 8, wherein the rear case comprises a slanted flange formed on a lower wall of the rear case, the slanted flange sealing an opening of the tray that faces the rear case.

13. A projector apparatus, comprising:

the light source assembly as recited in claim 8; and an optical unit for modulating light emitted from the light source assembly in response to an input video signal.

14. The projector apparatus of claim 13, further comprising:

a cooling unit including a ventilation fan for blowing cooling air into the light source assembly.

* * * * *